United States Patent [19]

Foster et al.

[11] 4,086,795
[45] May 2, 1978

[54] CABLE LOCK STORAGE STRUCTURE

[75] Inventors: Ronald Charles Foster, Lake Orion; Regis Victor Pilarski, Utica, both of Mich.

[73] Assignee: The Firestone Tire & Rubber Company, Akron, Ohio

[21] Appl. No.: 661,833

[22] Filed: Feb. 26, 1976

[51] Int. Cl.² ............................................ B02H 5/00
[52] U.S. Cl. .......................................... 70/233; 70/49
[58] Field of Search ................. 70/15, 18, 57, 58, 49, 70/233, 234, 30, 225–227; 240/107, 107.12, 107.6; 248/70; 24/262 R

[56] References Cited

U.S. PATENT DOCUMENTS

| | | | |
|---|---|---|---|
| 527,410 | 10/1894 | Free | 70/15 |
| 639,196 | 12/1899 | Fehling | 70/15 X |
| 673,612 | 5/1901 | Appleby | 70/15 |
| 1,831,666 | 11/1931 | Jacobia | 242/107.6 |
| 2,451,100 | 10/1948 | Lecomple | 242/107.6 |
| 3,689,004 | 9/1972 | Brown | 242/107 |
| 3,716,650 | 2/1973 | Mecquenem | 24/262 R X |
| 3,950,972 | 4/1976 | Bleier | 70/234 |

*Primary Examiner*—Robert L. Wolfe
*Attorney, Agent, or Firm*—Miller, Morriss and Pappas

[57] ABSTRACT

A cable lock storage structure adapted for selective mounting as upon a bicycle frame and having a locking cable stored on a spring loaded reel retractor assembly provided therein. The cable is selectively extendable from the housing so as to be wound through the bicycle frame and around an adjacent fixed structure so as to shackle the two together. The free end of the cable is adapted for selective locking engagement with a cable lock mechanism integrally provided in the housing so that the cable forms a closed loop locking assembly with the housing. A pawl lock mechanism is integrally provided in the housing to selectively and lockably engage the reel retractor so as to prevent retraction of the extended cable. The pawl lock mechanism is adapted to selectively be disengaged to permit retraction of the cable into the housing for storage when not in use.

4 Claims, 12 Drawing Figures

U.S.Patent May 2, 1978 Sheet 3 of 3 4,086,795

CABLE LOCK STORAGE STRUCTURE

This invention relates to a cable lock storage structure for bicycles and like structures and comprises a storage housing having a locking cable stored on a spring loaded reel retractor assembly provided therein. The invention further relates to a locking cable which is selectively extendable from the housing so as to be wound through the bicycle frame and around an adjacent structure so as to connect the two together. A cable lock assembly is integrally provided within the housing so as to lockably engage the free end of the extended cable to form a closed loop shackle assembly whereby the bicycle is secured to the adjacent (usually fixed) structure. A spring loaded pawl lock assembly is also integrally provided within the housing and the pawl lock assembly is adapted to selectively engage the reel retractor assembly so as to prevent retraction of the extended locking cable. The pawl lock mechanism is adapted to be selectively disengaged from the reel so as to permit automatic retraction of the locking cable into the housing for storage when not in use. The cable lock storage structure is provided with compression clips which make adjustable engagement with the tubular frame so as to retain the cable lock storage structure thereon. The compression clips are provided with plastic inserts which are adjustable with the clips so as to adjust to various frame tube sizes.

None of the known prior art devices teach a simple compact cable lock device for bicycles in which there is included a spring loaded retractor reel whereby a locking cable can be selectively extended to connect a bicycle to an adjacent structure and which engages a key operated lock assembly provided in the housing. None of the known prior art devices are provided with a spring loaded pawl assembly which engages the reel retractor assembly so as to prevent retraction of the extended cable but which is selectively disengageable to permit automatic retraction of the cable back into the housing for storage when not in use. None of the prior art devices utilizes an integrally formed support chassis which engages and connects the reel retractor assembly, the cable lock assembly and the pawl lock assembly. Examples of such prior art devices are seen in the United States Letters Patent to Parke No. 436,800, Strickland No. 1,991,825, Gossner No. 2,933,915, Falk No. 2,983,132 and Atwill No. 3,228,217.

A need has herefore existed for a simple, compact, easily assembled, substantially flat cable lock storage device comprising a molded housing provided with a locking cable stored on a spring loaded reel retractor assembly provided in the housing and which cable is selectively extendable to allow the connection of the bicycle upon which it is mounted to an adjacent fixed structure.

A need has further existed for a cable lock storage device having a cable lock mechanism provided therein so as to lockably engage the free end of the locking cable extended therefrom thereby providing a closed loop shackle lock assembly.

A further need has existed for a cable lock storage device provided with a spring loaded pawl lock mechanism which selectively engages the reel retractor assembly so as to prevent retraction of the locking cable and which is adapted to be selectively disengaged therefrom so as to permit automatic retraction of the locking cable into the housing for storage when not in use.

It is therefore an object of this invention to provide a simple, easily assembled and compact bicycle cable lock storage device which is provided with a selectively extendable locking cable mounted on a spring loaded reel retractor assembly mounted in an out of the way housing.

Yet another object of this invention is to provide a bicycle cable lock storage housing having a lever actuated spring loaded pawl locking mechanism which selectively engages the reel retractor to prevent retraction of an extended locking cable and which may be selectively disengaged to permit retraction of the locking cable into the housing for storage when not in use or to take up slack cable unnecessary for the lock up connection.

Other objects of this invention will be apparent to those skilled in the art upon reading the present description, drawings and claims.

IN THE DRAWINGS

GENERAL DESCRIPTION

In general, a cable lock storage structure for selective mounting upon bicycles and the like is provided having a housing structure which has locking cable and tongue element lock assembly access openings therein. A reel retractor assembly having a spring actuated retractor assembly in association therewith is rotatably mounted within the housing. The reel retractor assembly is provided with toothed ratchet wheels. A spring loaded pawl lock assembly is provided in the housing proximate to the reel retractor assembly and is adapted for selected engagement and disengagement with the teeth of the ratcheted outer edge surfaces of reel retractor assembly ratchet wheels. The pawl lock assembly is provided with a lever actuator arm which extends outwardly through said housing. A locking cable is mounted on said reel retractor assembly so as to be selectively extendable from and automatically retractable into said housing through the locking cable access opening provided in the housing. The locking cable is provided with a lock-engaging tongue element at the free end thereof which is adapted to lockably engage a tongue element lock assembly provided in the housing proximate to the lock assembly access opening. An integral support chassis can be selectively provided within the housing structure and which is adapted to supportably engage the reel retractor assembly, the tongue element lock assembly and the pawl lock assembly. The support chassis also has integral adjustable clamps which extend outwardly through the housing so as to adjustably engage a bicycle frame or other structure upon which the storage structure is mounted.

DESCRIPTION OF A PREFERRED EMBODIMENT

Figure 1:
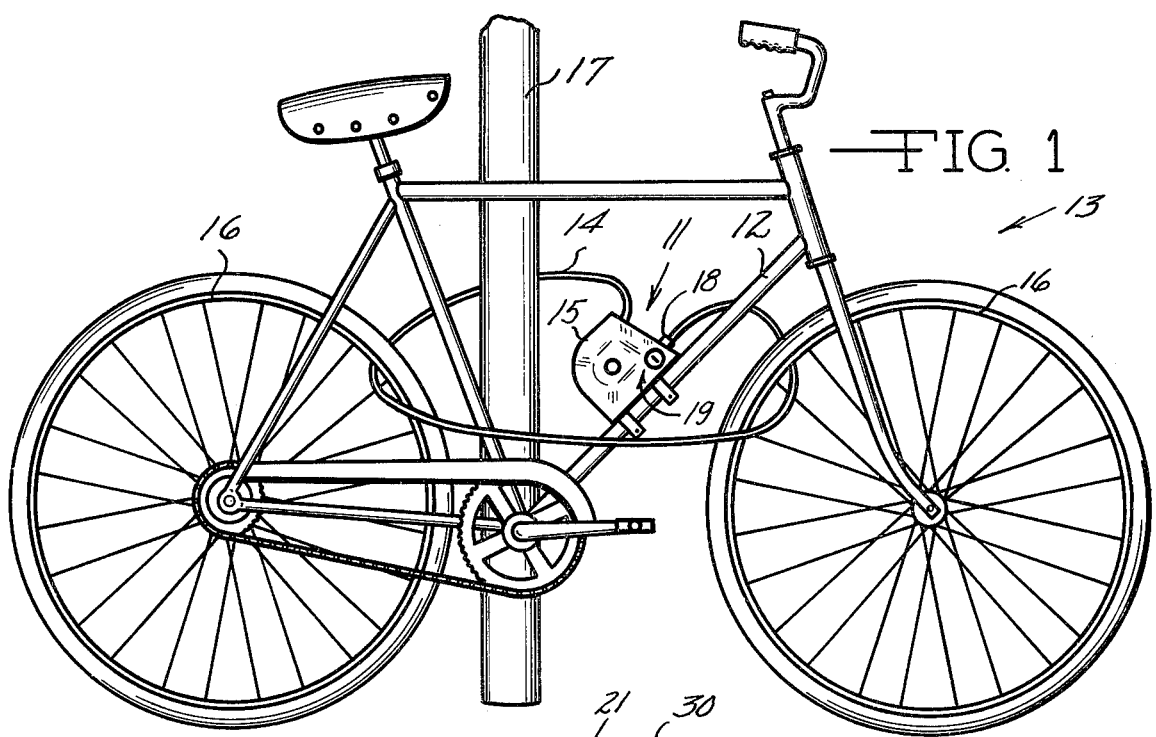
FIG. 1 is a side elevation view of the cable lock storage structure mounted upon a bicycle frame with the locking cable in its extended locked position to provide a closed loop lock shackle around a post to selectively lock a bicycle against unauthorized movement.

As shown in FIG. 1, a bicycle cable lock storage structure 11 is shown mounted upon a bicycle frame 12 of the bicycle 13 with the locking cable 14 extended from within the housing 15 so as to shackle the bicycle frame 12 and wheels 16 to an adjacent fixed structure 17, such as a post. The cable 14 is provided with a tongue or lock-engaging element 18 which engages a cable lock assembly 19 provided in the housing 15. As shown in the extended locked position of FIG. 1, the cable 14 forms a closed loop integral with the housing 15 and is selectively threaded through the bicycle frame 12 and wheels 16 so as to shackle them to an adjacent structure 17 which is preferably fixed. It is also within the scope of this invention that the closed loop cable 14 merely interlocks the bicycle frame 12 and wheels 16 by threading the cable therethrough so that the bicycle 13 cannot be ridden away.

Figure 2:
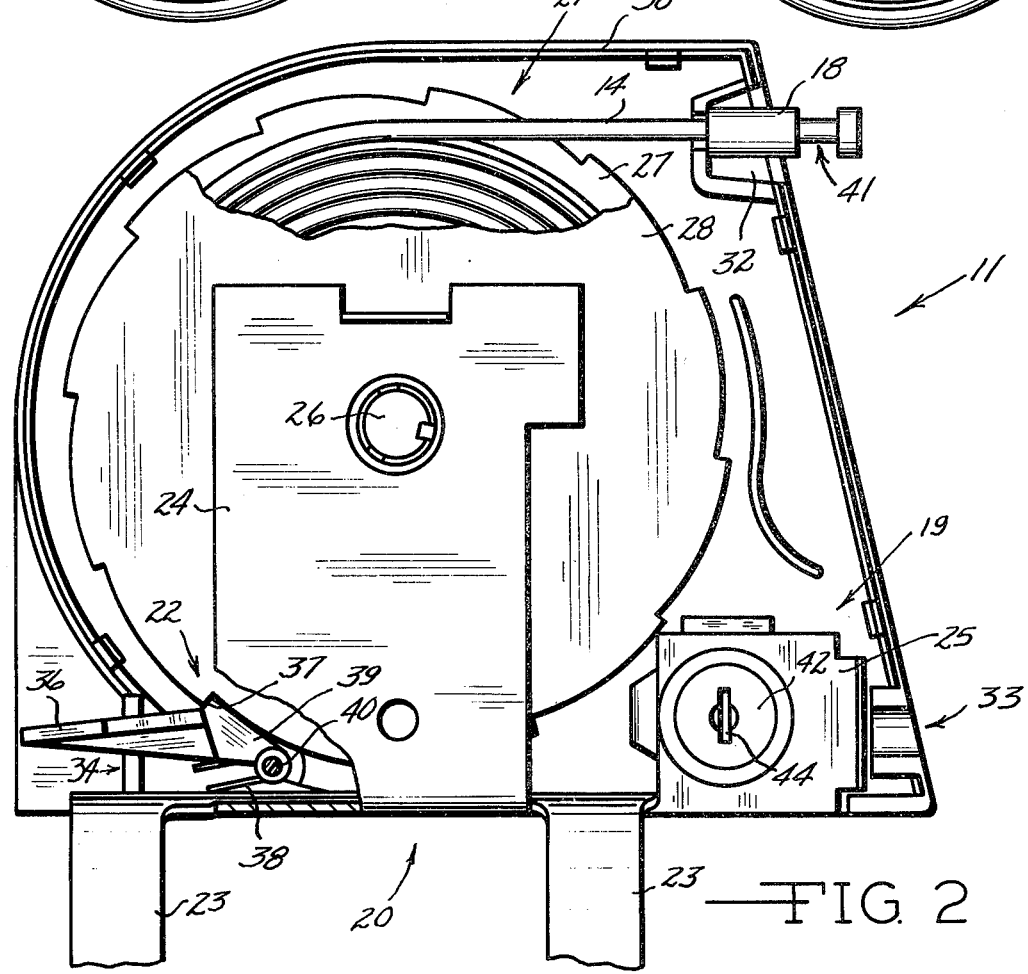
FIG. 2 is a side elevation view of the cable lock storage structure with a portion of the housing removed showing the locking cable in its stored position on the spring loaded reel retractor assembly provided within the housing and further illustrating the cable lock mechanism and the lever actuated pawl lock mechanism in association with the reel retractor assembly.
Figure 7:
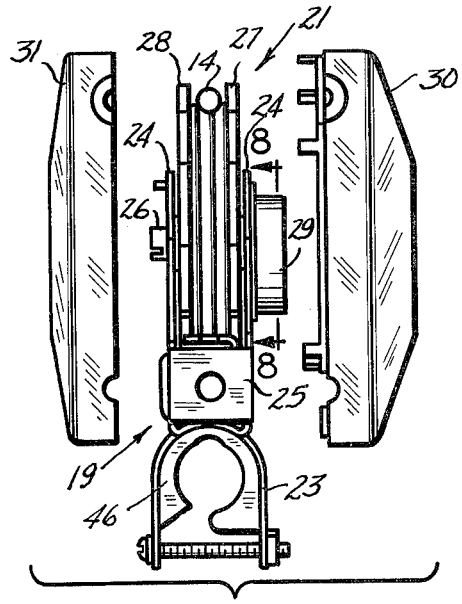
FIG. 7 is an exploded front elevation view of the cable lock storage structure and showing the housing members and the locking cable reel retractor assembly mounted between the housing members or covers and illustrating the compression clips and the frame engaging adjustable plastic inserts mounted therein.

As shown in FIG. 2, an integral support chassis 20 is provided upon which the cable lock assembly 19, a spring loaded reel retractor assembly 21 and spring biased pawl lock assembly 22 are mounted. A pair of retaining clips or clamps 23 are integrally provided on the chassis element 20 which are adapted to adjustably engage the bicycle frame 12 as shown in FIG. 1. The support chassis 20 is provided with a pair of spaced-apart upstanding journal arms or legs 24 which rotatably engage the spring loaded reel retractor assembly 21 therebetween as shown in FIGS. 2 and 7.

Figure 11:
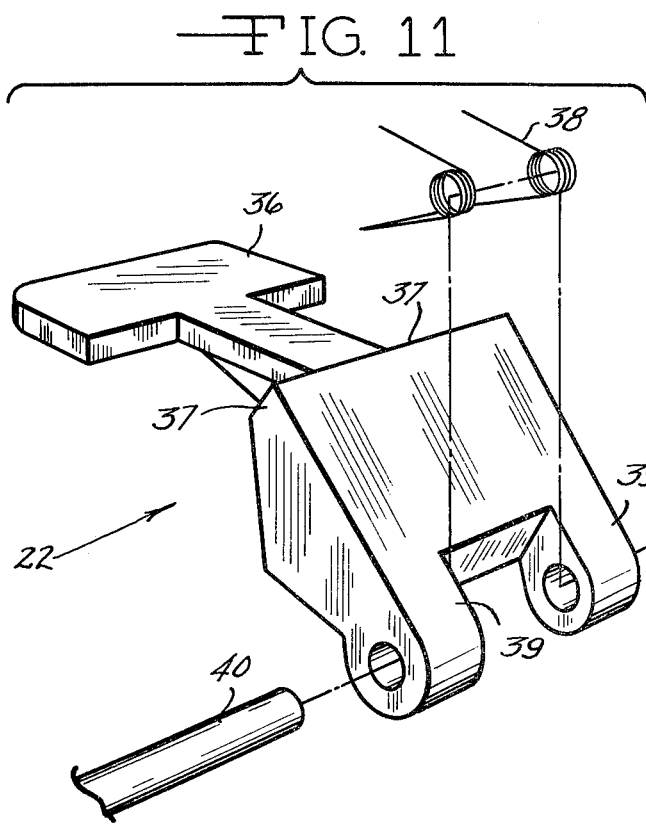
FIG. 11 is an exploded perspective view of the lever actuated spring loaded pawl lock mechanism which selectively engages and disengages the reel retractor ratchet assembly.

The spring lock pawl assembly 22 is also mounted between the journal arms or legs 24 so as to be in operative contact with the reel retractor assembly 21 as will be hereinafter described and as shown in FIGS. 2 and 11.

Figure 9:
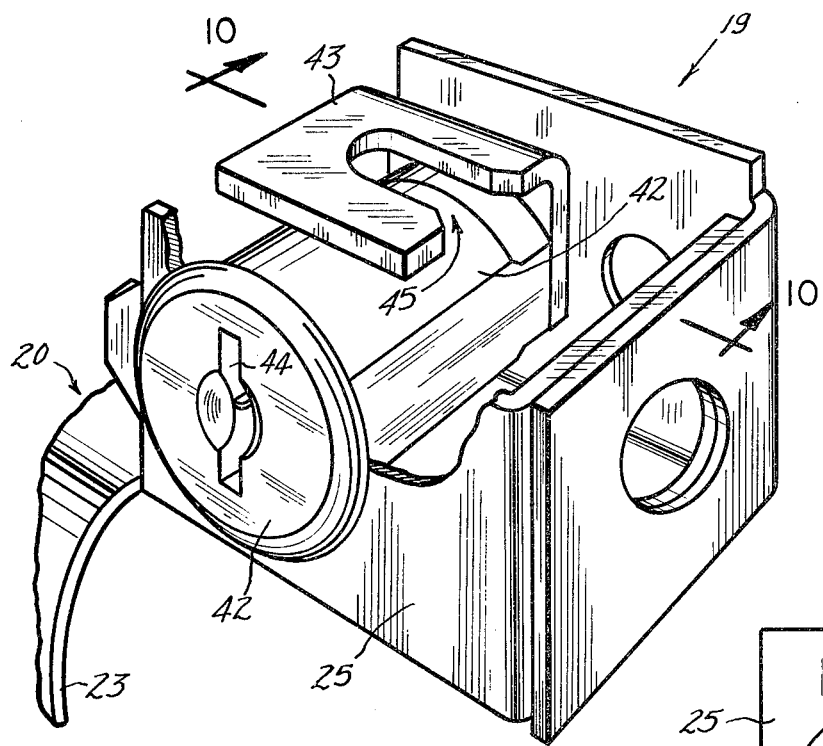
FIG. 9 is a perspective view of the cable lock mechanism illustrating the key-operated cable engaging lock plate element in its open position.
Figure 10:
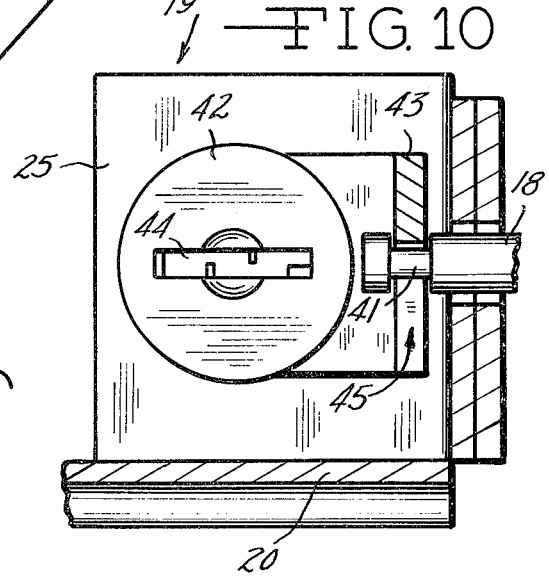
FIG. 10 is a side elevation cross-section view taken on the line 10—10 of FIG. 9 showing the cable lock mechanism and the lock plate element in locked engagement with the tongue element of the locking cable.

The support chassis 20 is further configured to form an integral lock housing 25 which houses the cable lock assembly 19 as will be hereinafter described and as shown in FIGS. 9 and 10.

The support chassis 20 thus provides an integral connection or anchor between the reel retractor assembly 21, the cable lock assembly 19 and the pawl lock assembly 22 whereby the resultant cable lock storage structure is relatively tamper-free when the locking cable 14 is in extended closed loop locked engagement with the cable lock assembly 19.

As shown in FIGS. 2 and 7, the reel retractor assembly 21 is comprised of a spindle 26 and spaced-apart ratchet wheel side members 27 and 28 which retain the coiled cable 14 therebetween within the housing 15. It is within the scope of the invention that only one of the wheels has a ratchet tooth outer circumferential surface. The ratchet wheel members 27 and 28 have ratchet tooth outer edge surfaces which are adapted to be selectively engaged by the pawl lock assembly 22 so as to selectively prevent retraction of the extended cable 14.

Figure 8:
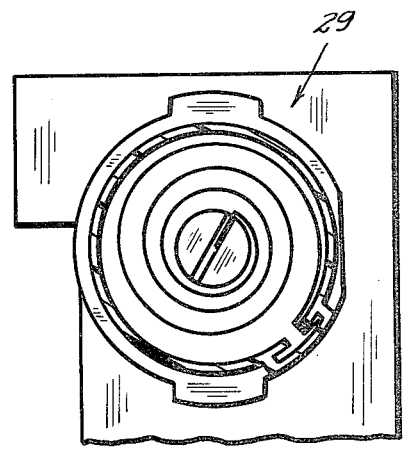
FIG. 8 is a side elevational section view taken on the line 8—8 of FIG. 7 showing the spring loaded reel retractor assembly.

As shown in FIGS. 7 and 8, a standard coil retractor spring unit 29 is provided in association with the reel retractor assembly 21 so as to provide for selective extension and automatic retraction of the cable 14 stored on the reel portion.

As shown in FIGS. 2 through 7, the housing 15 of the preferred embodiment of the invention is formed by housing members or covers 30 and 31 which matingly engage to enclose the support chassis 20 therebetween. When matingly engaged, the housing members 30 and 31 are configured to form a tongue element seating pocket 32, a lock assembly access opening 33 and a lever arm access opening 34 therethrough. The housing member 31 is provided with a key lock access opening 35 therethrough.

Figure 3:
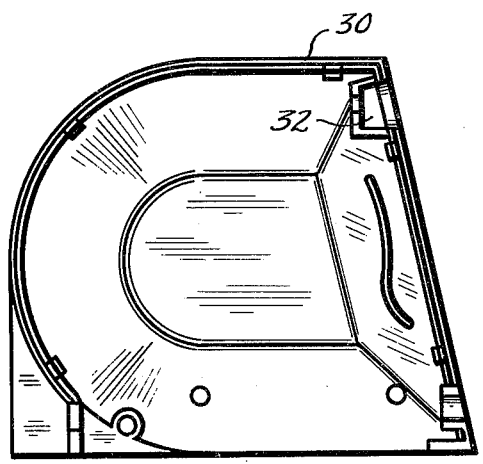
FIG. 3 is a side elevation view of the inside of one of the housing members or covers.
Figure 4:
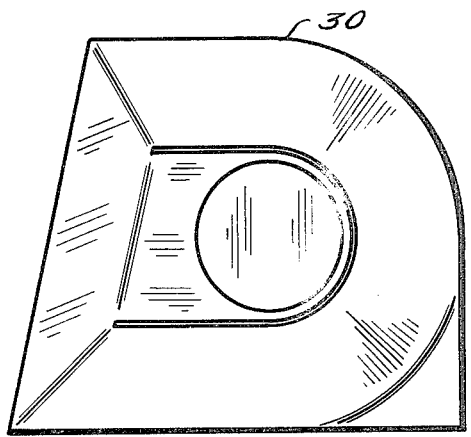
FIG. 4 is a side elevation view of the outside of the housing member shown in FIG. 3.
Figure 5:
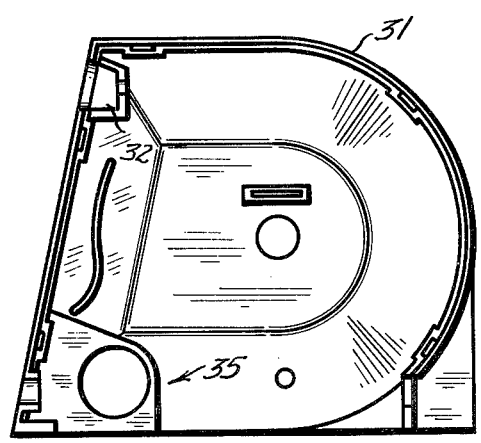
FIG. 5 is a side elevation view of the inside of the housing member having the lock access opening and which matingly engages the housing member or cover shown in FIG. 3.
Figure 6:
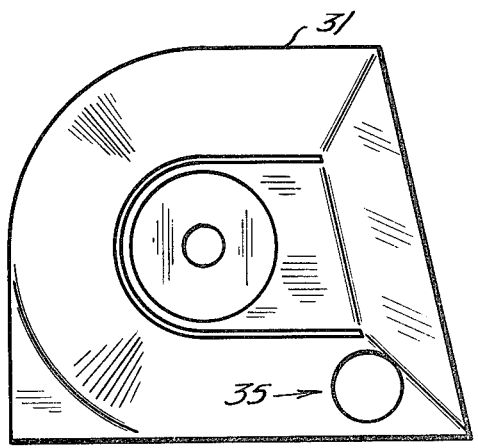
FIG. 6 is a side elevation view of the outside of the housing member shown in FIG. 5.

FIGS. 4 and 6 are side views which show the outer surfaces of the housing members 30 and 31. FIGS. 3 and 5 show the inner surfaces thereof.

In the preferred embodiment of the invention, the housing members 30 and 31 are formed from molded plastic, however, any other desired metal such as aluminum and the like can be utilized.

As shown in greater detail in FIG. 11, the pawl lock assembly 22 comprises a lever actuator arm 36, a pawl 37, a spring member 38, pivot arms 39 and a pivot pin 40 which pivotally secures the pawl lock assembly 22 to the journal arms 24. The spring member 38 biases the pawl lock assembly 22 against the ratcheted toothed outer surfaces of the ratchet wheels 27 and 28. As cable 14 is drawn or extended outwardly from the housing, the reel retractor assembly 21 is rotated in a clockwise direction and the pawl lock assembly 22 does not interfere with the rotation of the reel assembly 21 while the cable is being extended. However, when the outward pulling force on the cable 14 is terminated, the retractor spring unit 29 acts to automatically reel in the cable 14. However, as shown in FIG. 2, the pawl 37 of the pawl lock assembly 22 lockably engages the toothed ratcheted portion of the ratchet wheels 27 and 28 so as to oppose the action of the retractor spring unit 29, thus retaining the cable 14 in its extended use position.

When it is desired to automatically retract the cable 14 back into the housing, the lever 36 is depressed so as to disengage the pawl 37 from the ratchet wheels 27 and 28. The reel retractor assembly 21 automatically rotates in a counterclockwise direction under action of the retractor spring unit 29 so as to reel the cable 14 into its stored position in the housing.

The tongue or lock engaging element 18 provided on the free end of the cable 14 is seated within pocket 32 provided in the housing 15 when the cable 14 is fully retracted within the housing 15. The tongue element 18 remains firmly seated within the pocket 32 due to the retractive urging of the retractor spring unit 29. Thus, a quiet, vibration-free cable lock storage unit is provided.

The outer end portion of the tongue element 18 is provided with a lock element engaging annular groove 41. When the cable 14 is in its extended use position as shown in FIG. 1, the tongue element 18 is inserted into the cable lock assembly 19 through the access opening 33 provided in the housing 15.

The lock assembly 19 is shown in more specific detail in FIG. 9. A lock barrel 42 and lock plate 43 are rotatably mounted within the lock housing 25. The lock plate element 43 is fixedly attached to the barrel 42 and is movable therewith. The barrel 42 is selectively rotated by action of a key inserted into the key hole 44. The lock plate element 43 is provided with a slot 45 which lockably engages the annular groove 41 of the tongue 18 when the barrel 42 is rotated to move the lock plate element 43 from its vertically oriented "open" position shown in FIG. 9 to its horizontally oriented "lock" position shown in FIG. 10. Thus, the cable 14 is fixedly retained in its closed loop operative use position.

Figure 12:
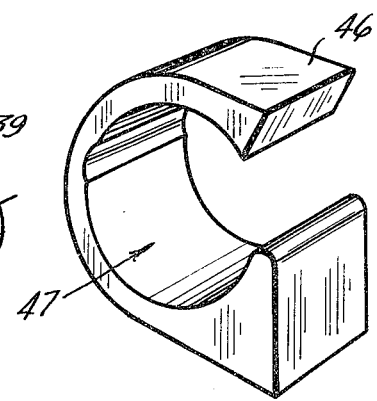
FIG. 12 is a perspective view of the adjustable plastic insert which is mounted within the compression clips for adjustable mating engagement with a bicycle frame.

As shown in FIGS. 7 and 12, a resilient adjustable plastic block insert 46 is provided for use in connection with the compression clip or clamp 23. The plastic insert 46 has a substantially U-shaped cross sectional configuration and is provided a circular bore 47 therethrough. The plastic insert 46 is adapted to make snap adjustable engagement over various sizes of bicycle frames. As the compression clamp 23 is tightened, the plastic insert 46 is adjustably moved so as to make clamping engagement with the frame tube 12 upon which it is mounted. Thus, the cable lock storage structure 11 can be mounted upon any size of bicycle frame tubing.

It is thus seen that a simple and compact bicycle cable lock storage structure is provided which is economical to manufacture and which has great versatility in use. It has a substantially flat overall configuration and is easily mountable on a bicycle frame so as not to interfere with the normal operation of the bicycle. The locking cable thereof is stored under tension so that it is relatively vibration-free and hence quiet when it is not in use. All components of the cable lock storage structure, including the reel retractor assembly and the cable lock assembly, are mounted on an integral support chassis so as to provide a substantially tamper-free closed loop locking structure. Further, the locking cable is held against inadvertent retraction when extended but can be selectively released for immediate automatic retraction into its stored position within its housing when not in use.

While the preferred embodiment of the invention has been described in use with a bicycle, it is within the scope of invention that the cable lock storage structure be used for securing other vehicles such as motorcycles, snowmobiles, boats and the like. It is also contemplated that the cable lock storage unit be mounted on fixed structures such as bicycle parking racks, boat docks and the like for securing vehicles, boats or other stationary objects or containers thereto.

From this presentation of an operative embodiment of our invention, improvements, modifications and substitutions will become apparent to those skilled in the art. Such improvements, modifications and substitutions are intended to be included within the spirit of the invention, limited only by the scope of the hereinafter appended claims.

We claim:

1. A cable lock storage structure for bicycles and the like comprising:
    an integral unitary cable lock assembly support chassis adapted for mounting upon a bicycle frame, said support chassis provided with compression clamp extensions which clampably engage a bicycle frame;
    a pair of housing members which matingly engage to substantially enclose said support chassis therebetween, said matingly engaged housing members forming a housing structure for said integral cable lock assembly support chassis, said housing structure provided with lever actuator arm, compression clamp extension, locking cable and tongue element lock assembly access openings;
    a reel retractor assembly rotatably mounted on said support chassis within said housing structure, said reel retractor assembly provided with a spring actuated retractor assembly, said reel retractor assembly having at least one toothed ratchet wheel;
    a spring loaded pawl lock assembly provided on said support chassis within said housing structure proximate to said reel retractor assembly, said pawl lock assembly provided with a lever actuator arm which extends outwardly from said housing structure through said lever actuator arm access opening, said pawl lock assembly adapted for selected engagement and disengagement with said toothed ratchet wheel of said reel retractor assembly;
    a locking cable mounted on said reel retractor assembly, said locking cable being selectively extendable from and automatically retractable into said housing structure through said locking cable access opening, said locking cable provided with a lock-engaging tongue element at the free end thereof; and
    a tongue element lock assembly provided on said support chassis in said housing proximate to said tongue element lock assembly access opening, said tongue element lock assembly adapted to lockably engage said locking cable tongue element inserted therein through said tongue element lock assembly access opening.

2. In the cable lock storage structure of claim 1 wherein said housing is provided with a tongue element seating pocket in association with said locking cable access opening.

3. In the cable lock storage structure of claim 1 wherein said lock assembly is provided a lock plate element having a tongue element engaging slot adapted to lockably engage an annular groove provided on the said tongue element.

4. In the cable lock storage structure of claim 1 wherein substantially U-shaped resilient plastic block inserts are provided in association with said compression clamps, said plastic block inserts having a circular hole therethrough so as to adjustably engage various sizes of bicycle frame tubing therethrough.

* * * * *